United States Patent

[11] 3,599,559

| [72] | Inventors | Roy Eugene Presley<br>4434 Shady Lane, Indianapolis, Ind.<br>46226;<br>Hubert Eugene Halcomb, P.O. Box 1595,<br>Indianapolis, Ind. 46204 |
|---|---|---|
| [21] | Appl. No. | 141 |
| [22] | Filed | Jan. 2, 1970 |
| [45] | Patented | Aug. 17, 1971 |

[54] COMBINATION WET-DRY GRIDDLE
7 Claims, 3 Drawing Figs.

[52] U.S. Cl. .................................................. 99/339, 99/340
[51] Int. Cl. ...................................................... A47j 37/12
[50] Field of Search ........................................... 99/340, 339, 372, 376, 403, 422—423, 424—425, 426—427, 443—444, 445—446; 220/4, 5, 20, 20.5, 22, 22.3

[56] References Cited
UNITED STATES PATENTS

| Re. 22,176 | 9/1942 | Russell et al. | 219/474 |
|---|---|---|---|
| 559,037 | 4/1896 | McCleary | 99/424 |
| 1,936,551 | 11/1933 | Garrison | 99/339 |
| 2,225,176 | 12/1940 | Lewis et al. | 99/372 |
| 2,607,287 | 8/1952 | Price | 99/372 |
| 2,840,436 | 6/1958 | Mason | 99/403 X |
| 3,130,664 | 4/1964 | Jarmuth et al. | 99/425 |
| 3,245,462 | 4/1966 | Ramer | 165/39 |
| 3,317,709 | 5/1967 | Beasley | 99/422 X |
| 3,393,295 | 7/1968 | Jepson et al. | 99/340 X |
| 3,495,525 | 2/1970 | Piotrowski | 99/403 X |

FOREIGN PATENTS

| 807,354 | 1/1959 | Great Britain | 99/403 |
|---|---|---|---|

Primary Examiner—Walter A. Scheel
Assistant Examiner—Arthur O. Henderson
Attorney—Woodard, Weikart, Emhardt & Naughton ABSTRACT: A settling trough provided at the front of a griddle plate has an exterior wall extending well above griddle plate level and around the side and rear portions of the perimeter of the griddle plate to contain oil or fat for deep frying of food products. An integral divider is provided from the front to the back and a drain is provided at the bottom of each settling trough with a separate valve in each drain permitting withdrawal of oil from one side of the divider independent of the other side, for simultaneous dry griddling at the one side and wet frying at the other. Independently controlled heating means are provided for each side of the divider.

PATENTED AUG 17 1971 3,599,559

INVENTORS
ROY EUGENE PRESLEY
HUBERT EUGENE HALCOMB

ATTORNEYS
Woodard, Weikart, Emhardt & Naughton

COMBINATION WET-DRY GRIDDLE

BACKGROUND OF THE INVENTION

1. Field of the Invention

This invention relates generally to griddles, and more particularly to a griddle capable of deep or shallow fat frying, or "dry" griddling, as desired.

2. Description of the Prior Art

Various prior art griddles are known. Comparatively few accommodate wet frying, and it is believed that there are none which will accommodate both wet frying and dry griddling at the same time and facilitate control of the level of oil or fat used during the frying. Examples of some of the prior art are illustrated in the U.S. Pat. Nos. as follows: Re 22,176 to Russell et al., Sept. 8, 1942; 3,130,664 to Jarmuth et al., Apr. 28, 1964; 3,245,462 to Ramer, Apr. 12, 1966; and 3,317,709 to Beasley, May 2, 1967.

It is the purpose of our invention to provide convenient features and versatility which, so far as we are informed, is neither available in the devices shown in the above patents, nor in any other prior art equipment of which we are aware.

SUMMARY

Described briefly, in a typical embodiment of the present invention, a splatter guard of substantial height extends completely around and is sealed to three margins of a griddle plate, and is spaced from the front edge of the plate and extends downwardly therefrom to form a portion of a settling trough. Drain means are provided in the bottom of the settling trough, and a divider is provided on the griddle plate and in the settling trough so that wet frying or dry griddling can be accomplished in one compartment independent of whether or not wet frying or dry griddling is being performed in the other compartment.

Portions of the foregoing views may be illustrated in section to illustrate certain details.

DESCRIPTION OF THE PREFERRED EMBODIMENT

Figure 3:
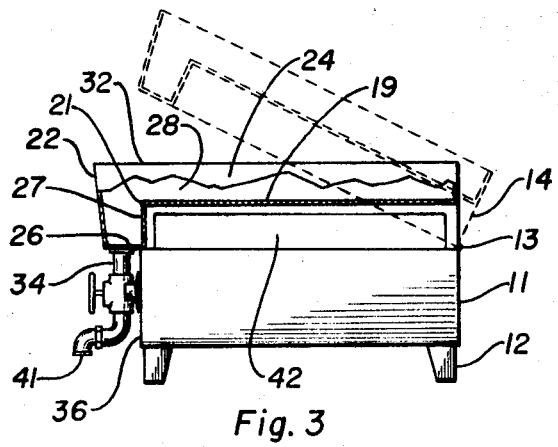
FIG. 3 is a side elevational view thereof.

Referring now to the drawings in detail, a base assembly 11 is provided with legs 12 for convenient support on a table, bench, or other surface of convenient height. If desired, longer legs could be provided for floor mounting. The base unit has a hinge 13 along the upper rear margin and which is connected to the lower rear margin of a rear wall 14 of a rectangular wall unit frame to which are welded three edges 16, 17 and 18 of a ggriddle plate 19 which extends from the rear wall 14 to an edge 21 spaced from the front wall 22 as best shown in FIG. 3 wherein the sidewall 24 is broken away to illustrate interior details. At the lower margin of the front wall 22 is a horizontal wall 26 extending rearwardly to a vertical wall 27 which is welded to the front edge portion of the griddle plate. A divider wall 28 is provided and is welded to the front, bottom, and rear walls 22, 26 and 27, respectively, at the front of the unit, and is welded to the top of the griddle plate and upwardly along the rear wall 14 to the upper margin thereof. Thus, it is completely sealed to the front and rear walls of the perimeter wall frame and to the upper face of the griddle plate, thus defining two compartments 29 and 31, each of which is capable of containing liquid up to the upper margin 32 of the perimeter frame.

The structure described to this point forms a two-compartment wet-dry griddle and settling trough, the portion above the griddle plate being available for deep or shallow frying, or dry griddling, and the portion between the front edge of the griddle plate and the front wall of the frame serving as a settling trough. The wall portions which extend well above the griddle plate elevation serve to contain the oil or fat for deep or shallow wet frying, and serve also as a splatter guard while dry griddling is being performed.

To facilitate the choice of modes of use, drain lines are provided at 33 and 34 in the bottom of the settling trough were it overhangs the front wall 36 of the base. Valves 37 and 38 are provided in the lines 33 and 34, respectively, and outlets 39 and 41 are provided in front of a vertical projection of the front wall 22 thus assuring that there will be ample space in front of the table or bench to which the table is mounted, for admission of a collector pail or other means for receiving the contents drained from the drain trough.

Figure 1:
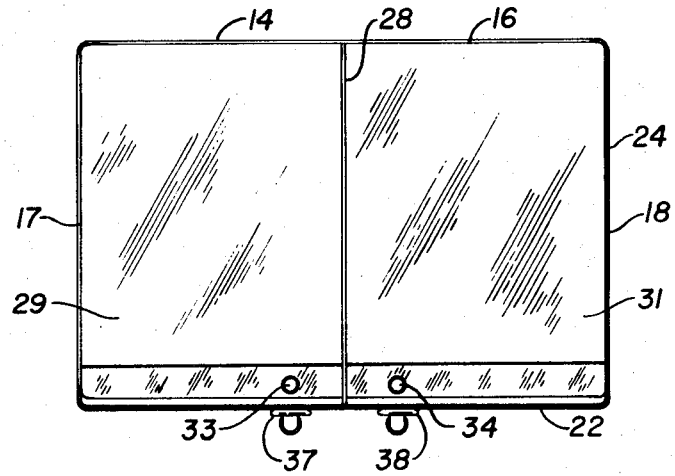
FIG. 1 is a top plan view of a combination griddle illustrating a typical embodiment of the present invention.
Figure 2:
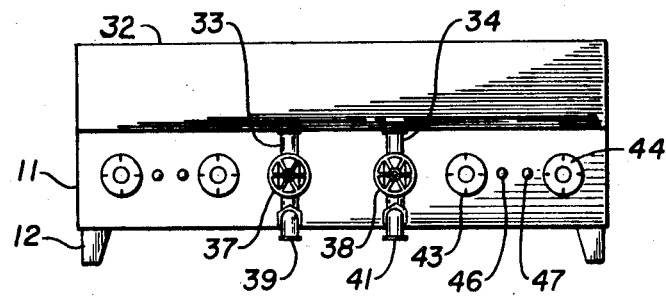
FIG. 2 is a front elevational view thereof.

As indicated schematically at 42 in FIG. 3, electric heating elements are provided on the top of the base unit and immediately under the griddle plate. Separately controlled elements are provided for that portion of the griddle plate at each side of divider 28. As is better shown in FIG. 2, two sets of thermostatic temperature controls 43 and 44, for example, together with indicator lights 46 and 47, are provided on the front panel of the base assembly, one for each of two portions of the heating element serving the respective side of the griddle plate.

The The invention we claim is: along the rear wall is to facilitate elevation for tipping upwardly and rearwardly of the entire griddle plate and settling trough assembly as indicated by the dotted outline in FIG. 3. This provides convenient access to the heating elements in the event that they should ever happen to need attention.

While the invention has been disclosed and described in some detail in the drawings and foregoing description, they are to be considered as illustrative and not restrictive in character, as other modifications may readily suggest themselves to persons skilled in this art and within the broad scope of the invention. For example, additional dividers drains and heating elements and controls therefor, can be provided to further compartmentalize the product.

The invention we claim is:

1. A griddle combination comprising:

a generally rectangular griddle plate;

a splatter guard extending completely around said griddle plate and sealed to said plate along the left and right side and rear edges of said plate and spaced from the front edge of said plate and extending downwardly from the level of said plate to provide the front wall of a settling trough;

a rear wall of said settling trough extending upwardly from the bottom thereof and sealed to the front edge of said griddle plate;

permanently affixed divider means sealed to said splatter guard at the front and rear of said settling trough and griddle plate respectively and sealed to said griddle plate and to the front and rear walls and bottom of said settling trough to provide at least two compartments, each compartment being capable of holding a cooking liquid independently of the other.

2. The combination of claim 1 and further comprising:

a plurality of griddle plate heating means, one of said heating means being disposed below the griddle plate portion for the first of said compartments, and the other of said heating means being disposed below the griddle plate portion for the second of said compartments, and separate control means for each of said heating means.

3. The combination of claim 1 wherein:

said guard extends sufficiently high throughout its perimeter to contain a pool of oil over said griddle plate in each compartment and thereby accommodate cooking of foodstuffs submerged in oil on said griddle plate.

4. The combination of claim 3 and further comprising:

a pair of drains, one of said drains being provided in the settling trough portion for one of said compartments, and the other of said drains being provided in the settling trough portion for the other of said compartments, each of said drains having a valve therein facilitating draining one compartment independently of the other to accommodate dry griddling in one compartment and simultaneous shallow fat frying in the other compartment.

5. The combination of claim 3 and further comprising:
griddle heating means;
a base unit having control means therein coupled to said heating means;
and hinge means connecting the combination of said griddle plate and splatter guard to said base unit and accommodating tilting upward of said griddle plate on said base unit for access to said heating means.

6. The combination of claim 3 and further comprising:
drain means in the bottom of said settling trough portion and having valve means therein under said settling trough portion.

7. The combination of claim 6 and further comprising:
heating means for said griddle plate;
a base unit having a front wall set in from a downward projection of said drain means and valve means;
said base unit having control means thereon for said heating means.